(No Model.)
N. CLEMENT.
HOLDER FOR PENS AND PENCILS.
No. 356,524. Patented Jan. 25, 1887.
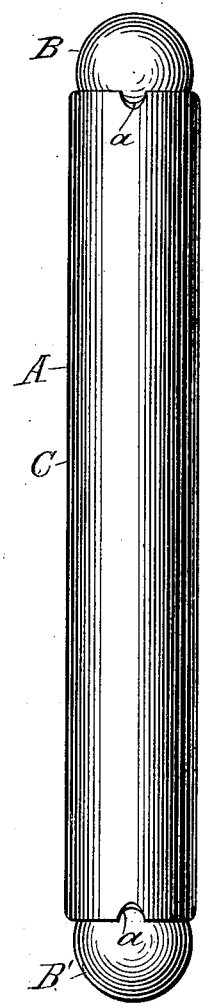
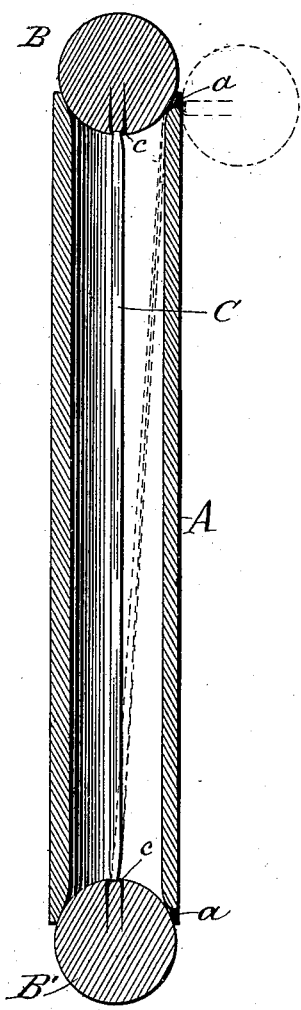
WITNESSES:
INVENTOR
Nelson Clement
BY
ATTORNEY

UNITED STATES PATENT OFFICE.

NELSON CLEMENT, OF CHICAGO, ILLINOIS.

HOLDER FOR PENS AND PENCILS.

SPECIFICATION forming part of Letters Patent No. 356,524, dated January 25, 1887.

Application filed October 21, 1886. Serial No. 216,815. (No model.)

*To all whom it may concern:*

Be it known that I, NELSON CLEMENT, a citizen of the United States of America, residing at Chicago, in the county of Cook and State of Illinois, have invented certain new and useful Improvements in Holders for Pens and Pencils, of which the following is a specification, reference being had therein to the accompanying drawings.
The object of my invention is to provide a holder for pens and pencils that is strong, light, and cheap to manufacture; and, principally, it consists of a hollow cylinder made from bamboo, pasteboard, or other light and strong material, the ends of which cylinder are closed by two balls connected by an elastic string or cord passed through such cylinder, all as will be more fully hereinafter described and specifically claimed.
In the accompanying drawings, Figure 1 represents an exterior view of the pencil-case, and Fig. 2 a longitudinal section of the same.

Corresponding letters in the several figures of the drawings designate like parts.
A denotes the case, preferably formed of a section of bamboo, with the inward edges of the end openings chamfered, and with a notch, *a*, cut into one side of each end.

B and B' are two balls, preferably turned of light wood, and both connected by a rubber band or cord, C, the ends of which are secured to such balls by small staples *c*. The rubber band or cord C being passed through the case, it will exert its elastic force to hold the balls in or against the end openings. For opening the case, either ball B or B' is swung sidewise over the notch *a*, in which then the rubber band or cord C will find its bearing, when the ball will shoulder against the edges of such notch, occupying relative to case A an about rectangular position, as shown by dotted lines in Fig. 2.

Instead of bamboo, I can form the case of pasteboard or sheet metal, and the balls I can make as well of papier-maché or other suitable light material, and in place of the rubber band or cord a spiral spring may be used.

As will be readily seen, a pencil-case thus made is very light and strong, and is readily opened, and the covers, thus being elastically connected, cannot be lost, nor will they open on their own accord.

Match-boxes and the like can be made on the same principle, and therefore I desire to be protected for all the uses to which this device may be applied.

What I claim is—

1. A holder for pens and pencils, consisting of a hollow cylinder closed at its ends by balls connected by an elastic band or strap, substantially as set forth.

2. A holder for pens and pencils, composed of a section of bamboo and of ball-shaped covers connected by an elastic cord or band passed through the casing, substantially as set forth.

3. A holder for pens and pencils, consisting of hollow cylinder A, having notches *a*, and of balls B, connected by elastic band or cord C, substantially as set forth, to operate as specified.

In testimony whereof I affix my signature in presence of two witnesses.

NELSON CLEMENT.

Witnesses:
WILLIAM H. LOTZ,
W. A. SWEET.